Patented Sept. 23, 1924.

1,509,406

UNITED STATES PATENT OFFICE.

CHARLES E. KRAUS, OF BROOKLYN, NEW YORK.

PLASTIC COMPOSITION AND METHOD OF MAKING THE SAME.

No Drawing. Application filed April 17, 1919, Serial No. 290,671. Renewed December 14, 1923.

*To all whom it may concern:*

Be it known that I, CHARLES E. KRAUS, a citizen of the United States, residing in the borough of Brooklyn, city of New York, in the county of Kings and State of New York, have invented certain new and useful Improvements in Plastic Compositions and Methods of Making the Same, of which the following is a full, clear, and exact specification.

It is well known that the plasticity of clays is regulated very largely by what is known in the ceramic art as "water of plasticity." This term designates the amount of water required to develop the maximum of plasticity. My invention has for its object to increase the plasticity of clay and other mineral substances having a limited degree of plasticity, or to impart plasticity to minerals which practically lack it, by adding thereto a certain proportion of fine grained minerals, having greater absorptive power for water than the clay or other material to be improved in plasticity, and containing a higher percentage of colloidal matter than such clay or other material.

My invention may be used to increase the plasticity of kaolin, clay, bauxite, calcium carbonate, flint, shale, cement rock, asbestos, etc. Among the minerals suitable for use as plasticity-improving agents as referred to above, I will mention bentonite, ehrenbergite, damonterolite and montmorillonite. These materials having colloidal properties of the order of bentonite and similar highly colloidal materials are in a different class as regards their colloidal contents from the ordinary clays such as kaolin, klingenburg, etc., bentonite usually containing from 85 to 95% of colloidal matter and ehrenbergite from 70% up, whereas ordinary clay usually contains only from one-half of one per cent to one and one-half per cent of colloidal matter, although some of the ordinary clays, especially klingenburg, may have a larger proportion. It is to be understood that the term colloidal matter as used herein means that matter which gives bentonite and similar substances their colloidal properties.

The bentonite or similar material is added to the clay or other substance to be improved in plasticity, either as a dry powder, or mixed with (suspended in) water, or with a viscous solution, such as a solution of alum or of sodium silicate, and by the use of such a viscous solution a gelatinous mass is obtained. The dry powdered material, or the mixture of such material with water, or the gelatinous mass mentioned above, is mixed thoroughly (in any suitable apparatus) with the clay or other substance to be improved. But instead of treating the clay or like substance in this manner, I may apply the treatment to any mixture in which clay or an analogous substance is used.

The percentage of bentonite or other equivalent containing a very high percentage of colloidal matter added to the clay or other substance will vary according to the nature of the material and of the substance with which it is to be mixed. Thus if bentonite is used for improving the plasticity of clay, kaolin, or the like, from five to ten per cent of bentonite will be sufficient, unless very great plasticity is desired, in which case a higher proportion of bentonite will be employed. If a material less plastic than clay is to be improved, for instance bauxite, flint, calcium carbonate, etc., a greater percentage of the bentonite or other fine grained mineral substance will be required than when treating clay; say, from fifteen to twenty per cent of bentonite will be employed in this case instead of from five to ten per cent, for ordinary use, and more if very high plasticity is to be obtained.

The improvement in plasticity secured by the addition of the fine grained minerals referred to above, is probably due to the fact that they fill the voids between the particles of clay or the like, and cause the mass of clay when dried, to become stronger and denser, thereby improving its bonding quality. This action is probably due to the very high percentage of colloidal matter contained in bentonite and similar materials, said percentage, as stated above, being from about forty-five to about two hundred times as high as it is for clay. Another advantage of my new treatment is that the clay, upon being fired, reaches the proper density at a lower temperature than heretofore, which is of value for certain classes of work.

I am aware of the well-known methods of increasing the plasticity of kaolin by the addition of gums, tannic acid, electrolytes, etc. All of these however have certain undesirable effects, which are avoided by the use of my invention. Thus, when an electrolyte is added, it has a tendency to float to the surface and to produce uneven results during firing since the surface of the clay body will in this case fuse more readily than its interior. The addition of gums impairs the burning density of the clay.

My invention improves the clay or other material as regards its raw strength, its bonding power, its density upon being fired, and its slacking qualities.

By my invention it is possible to increase the plasticity of kaolin to such an extent that ball clay may be eliminated in making bodies or glazes in the manufacture of pottery and similar wares, thereby improving such goods in color and translucency, as well as reducing the cost of manufacture.

Various modifications may be made without departing from the nature of my invention as defined in the appended claims.

While in some of the appended claims, bentonite is named as the plasticity-improving agent, I desire it to be understood that this covers equivalents, such as ehrenbergite or damonterolite.

I claim as my invention:—

1. A plastic composition consisting of from 90 to 95% of kaolin and from 10 to 5% of bentonite.

2. In the method of imparting plasticity to a mineral material, the step which consists in finely dividing a mineral substance consisting in the greater part of colloidal matter and thoroughly mixing it with said material.

3. In the method of imparting plasticity to a mineral material, the step which consists in finely dividing a mineral substance normally having colloidal properties much in excess of ordinary clays and thoroughly mixing it with said material.

4. In a method of imparting plasticity to a mineral material, the step which consists in finely dividing bentonite and thoroughly mixing it with said material.

5. In the method of imparting plasticity to a mineral material, the step which consists in powdering a mineral substance consisting in the greater part of colloidal matter and thoroughly mixing it with said material.

6. In the method of imparting plasticity to a mineral material, the step which consists in powdering a mineral substance normally having colloidal properties much in excess of ordinary clays, and thoroughly mixing it with said material.

7. In the method of imparting plasticity to a mineral material, the step which consists in powdering bentonite and thoroughly mixing it with said material.

8. In the method of imparting plasticity to a mineral material, the step which consists in finely dividing hydrous silicate of alumina normally having colloidal matter much in excess of ordinary clays, and thoroughly mixing it with said material.

9. In the method of imparting plasticity to a mineral material, the step which consists in powdering hydrous silicate of alumina normally having colloidal matter much in excess of ordinary clays and thoroughly mixing it with said material.

10. The method of forming a fired article of manufacture which comprises the steps of finely dividing a mineral substance normally having colloidal properties in excess of ordinary clays, thoroughly mixing it with another mineral substance and firing the mixture.

11. A fired cohesive article of manufacture containing thoroughly mixed mineral material and a mineral substance normally having colloidal properties much in excess of ordinary clays.

12. A fired cohesive article of manufacture containing thoroughly mixed mineral material and bentonite.

13. In the method for adding plasticity and bonding strength to a shaped and fired cohesive body containing clay the steps which consist in incorporating in a composition containing clay, finely divided bentonite, thoroughly mixing the mass, shaping the body and subjecting the same to firing.

14. A fired cohesive body comprising a mixture containing clay and bentonite.

15. A fired cohesive body comprising a mixture containing kaolin and bentonite.

In testimony whereof, I affix my signature.

CHARLES E. KRAUS.